US010516604B2

(12) United States Patent
Tanabe et al.

(10) Patent No.: US 10,516,604 B2
(45) Date of Patent: Dec. 24, 2019

(54) PACKET FORWARDING SYSTEM, CONTROL APPARATUS, AND CONTROL METHOD AND PROGRAM FOR RELAY DEVICE

(71) Applicant: NEC Corporation, Tokyo (JP)

(72) Inventors: Yosuke Tanabe, Tokyo (JP); Masanori Takashima, Tokyo (JP)

(73) Assignee: NEC Corporation, Tokyo (JP)

( * ) Notice: Subject to any disclaimer, the term of this patent is extended or adjusted under 35 U.S.C. 154(b) by 107 days.

(21) Appl. No.: 15/105,342

(22) PCT Filed: Dec. 18, 2014

(86) PCT No.: PCT/JP2014/083551
§ 371 (c)(1),
(2) Date: Jun. 16, 2016

(87) PCT Pub. No.: WO2015/093561
PCT Pub. Date: Jun. 25, 2015

(65) Prior Publication Data
US 2016/0315852 A1 Oct. 27, 2016

(30) Foreign Application Priority Data
Dec. 19, 2013 (JP) .................... 2013-262915

(51) Int. Cl.
*H04L 12/709* (2013.01)
*H04L 12/721* (2013.01)
(Continued)

(52) U.S. Cl.
CPC ............ *H04L 45/32* (2013.01); *H04L 12/462* (2013.01); *H04L 45/245* (2013.01); *H04L 47/33* (2013.01); *Y02D 50/30* (2018.01)

(58) Field of Classification Search
CPC ........ H04L 45/245; H04L 45/00; H04L 45/32
(Continued)

(56) References Cited

U.S. PATENT DOCUMENTS 6,772,219 B1 * 8/2004 Shobatake .......... H04L 49/3009
370/351
8,774,175 B2 7/2014 Shiraki
(Continued)

FOREIGN PATENT DOCUMENTS

CN 103036760 4/2013
JP 2012-60327 3/2012
(Continued)

OTHER PUBLICATIONS

N. McKeown et al., "OpenFlow: Enabling Innovation in Campus Networks", [online], [searched performed on Nov. 29, 2013], Internet <URL: http://archive.openflow.org/documents/openflow-wp-latest.pdf>, Mar. 2008.
(Continued)

*Primary Examiner* — Khaled M Kassim
*Assistant Examiner* — Jason A Harley
(74) *Attorney, Agent, or Firm* — Finnegan, Henderson, Farabow, Garrett & Dunner, L.L.P.

(57) ABSTRACT

A control apparatus sets, in a relay device: first control information that forwards, when a packet for flooding is received by a representative port of a trunk, the packet to a prescribed forwarding destination port and to a representative port of another trunk; second control information that executes, when the packet for flooding is received by a nonrepresentative port of the truck, forwarding of the packet to a stack link port associated with the same trunk group as the trunk of the port that received the packet for flooding, and forwarding to a nonrepresentative port of another trunk in the trunk group; and third control information that for-
(Continued)

wards, when the packet for flooding is received by the stack link port, the packet to a prescribed forwarding destination port and to a representative port of a trunk not belonging to the same trunk group.

11 Claims, 14 Drawing Sheets

(51) Int. Cl.
 *H04L 12/801* (2013.01)
 *H04L 12/46* (2006.01)
(58) Field of Classification Search
 USPC .......................................................... 370/390
 See application file for complete search history.

(56) References Cited

U.S. PATENT DOCUMENTS

| | | | | |
|---|---|---|---|---|
| 2006/0133264 | A1* | 6/2006 | Yamauchi | H04L 41/0677 370/216 |
| 2007/0058602 | A1* | 3/2007 | Shimada | H04L 12/66 370/340 |
| 2008/0189769 | A1 | 8/2008 | Casado et al. | |
| 2009/0010254 | A1* | 1/2009 | Shimada | H04L 45/245 370/389 |
| 2011/0317701 | A1 | 12/2011 | Yamato et al. | |
| 2012/0057590 | A1* | 3/2012 | Shiraki | H04L 12/2809 370/359 |
| 2012/0307713 | A1* | 12/2012 | Watanabe | H04W 88/12 370/315 |
| 2014/0192807 | A1* | 7/2014 | Otake | H04L 47/10 370/390 |
| 2015/0110107 | A1 | 4/2015 | Ishizuka | |

FOREIGN PATENT DOCUMENTS

| | | |
|---|---|---|
| WO | WO 2008/095010 A1 | 8/2008 |
| WO | WO 2013/118873 A1 | 8/2013 |
| WO | WO 2013/176262 A1 | 11/2013 |

OTHER PUBLICATIONS

OpenFlow Switch Specification, Version 1.1.0 Implemented (Wire Protocol 0 × 02), [online], [searched on Nov. 29, 2013], Internet <URL: https://archive.openflow.org/documents/openflow-spec-v1.1.0.pdf>, Feb. 2011.
International Search Report and Written Opinion dated Mar. 24, 2015, in corresponding PCT International Application.
Extended European Search Report dated Aug. 14, 2017, in counterpart European Application No. 14871212.8.
Office Action dated Jul. 4, 2018, by the State Intellectual Property Office of the People's Republic of China in a corresponding application No. 201480069838.2.

\* cited by examiner

FIG. 4

| TRUNK ID | RELAY DEVICE | TRUNK CONFIGURATION PORT |
|---|---|---|
| T001 | 100A | #1 |
| | 100C | #1 |
| T002 | 100A | #2 |
| | 100C | #2 |

FIG. 5

| STACK LINK ID | RELAY DEVICE | EAST STACK LINK PORT | WEST STACK LINK PORT |
|---|---|---|---|
| S001 | 100A | #3 | #4 |
| | 100B | #3 | #4 |
| | 100C | #3 | #4 |

FIG. 6

| TRUNK GROUP ID | STACK LINK ID | TRUNK ID |
|---|---|---|
| G001 | S001 | T001 |
| | | T002 |

FIG. 7

| TRUNK ID | RELAY DEVICE | REPRESENTATIVE PORT |
|---|---|---|
| T001 | 100A | #1 |
| T002 | 100A | #2 |

FIG. 8

| RECEIVING PORT TYPE | FORWARDING DESTINATION PORT TYPE |
|---|---|
| DISTRIBUTION TREE PORT FOR BROADCAST PACKET | EXTERNAL COMMUNICATION NODE PORT THAT IS NOT A TRUNK CONFIGURATION PORT |
| | TRUNK REPRESENTATIVE PORT |
| EXTERNAL COMMUNICATION NODE PORT THAT IS NOT A TRUNK CONFIGURATION PORT | DISTRIBUTION TREE PORT FOR BROADCAST PACKET |
| | EXTERNAL COMMUNICATION NODE PORT THAT IS NOT ANOTHER TRUNK CONFIGURATION PORT |
| | TRUNK REPRESENTATIVE PORT |
| TRUNK REPRESENTATIVE PORT | DISTRIBUTION TREE PORT FOR BROADCAST PACKET |
| | EXTERNAL COMMUNICATION NODE PORT THAT IS NOT A TRUNK CONFIGURATION PORT |
| | ANOTHER TRUNK REPRESENTATIVE PORT |
| TRUNK MEMBER PORT | EAST/WEST STACK LINK PORT OF THE SAME TRUNK GROUP |
| | OTHER TRUNK MEMBER PORT OF THE SAME TRUNK GROUP |
| EAST/WEST STACK LINK PORT OF TRUNK CONFIGURATION NODE | DISTRIBUTION TREE PORT FOR BROADCAST PACKET |
| | EXTERNAL COMMUNICATION NODE PORT THAT IS NOT A TRUNK CONFIGURATION PORT |
| | TRUNK REPRESENTATIVE PORT OUTSIDE OF THE SAME TRUNK GROUP |
| EAST STACK LINK PORT OF STACK LINK NODE | WEST STACK LINK PORT OF THE SAME TRUNK GROUP |
| WEST STACK LINK PORT OF STACK LINK NODE | EAST STACK LINK PORT OF THE SAME TRUNK GROUP |

FIG. 11

| TRUNK ID | RELAY DEVICE | TRUNK CONFIGURATION PORT |
|---|---|---|
| T001 | 100A | #1,#M |
|  | 100C | #1,#N |
| T002 | 100A | #2,#O |
|  | 100C | #2,#P |

FIG. 12

| TRUNK ID | REPRESEN-TATIVE NODE | REPRESEN-TATIVE PORT | MEMBER NODE | MEMBER REPRESEN-TATIVE PORT |
|---|---|---|---|---|
| T001 | 100A | #1 | 100C | #1 |
| T002 | 100A | #2 | 100C | #2 |

FIG. 13

| RECEIVING PORT TYPE | FORWARDING DESTINATION PORT TYPE |
|---|---|
| DISTRIBUTION TREE PORT FOR BROADCAST PACKET | EXTERNAL COMMUNICATION NODE PORT THAT IS NOT A TRUNK CONFIGURATION PORT |
| | TRUNK REPRESENTATIVE PORT |
| EXTERNAL COMMUNICATION NODE PORT THAT IS NOT A TRUNK CONFIGURATION PORT | DISTRIBUTION TREE PORT FOR BROADCAST PACKET |
| | EXTERNAL COMMUNICATION NODE PORT THAT IS NOT ANOTHER TRUNK CONFIGURATION PORT |
| | TRUNK REPRESENTATIVE PORT |
| TRUNK REPRESENTATIVE PORT/ MEMBER PORT OF TRUNK REPRESENTATIVE NODE | DISTRIBUTION TREE PORT FOR BROADCAST PACKET |
| | EXTERNAL COMMUNICATION NODE PORT THAT IS NOT A TRUNK CONFIGURATION PORT |
| | REPRESENTATIVE PORT OF ANOTHER TRUNK |
| TRUNK MEMBER REPRESENTATIVE PORT/ MEMBER PORT OF TRUNK MEMBER NODE | EAST/WEST STACK LINK PORT OF THE SAME TRUNK GROUP |
| | OTHER TRUNK MEMBER REPRESENTATIVE PORT OF THE SAME TRUNK GROUP |
| EAST/WEST STACK LINK PORT OF TRUNK CONFIGURATION NODE | DISTRIBUTION TREE PORT FOR BROADCAST PACKET |
| | EXTERNAL COMMUNICATION NODE PORT THAT IS NOT A TRUNK CONFIGURATION PORT |
| | TRUNK REPRESENTATIVE PORT OUTSIDE OF THE SAME TRUNK GROUP |
| EAST STACK LINK PORT OF STACK LINK NODE | WEST STACK LINK PORT OF THE SAME TRUNK GROUP |
| WEST STACK LINK PORT OF STACK LINK NODE | EAST STACK LINK PORT OF THE SAME TRUNK GROUP |

PACKET FORWARDING SYSTEM, CONTROL APPARATUS, AND CONTROL METHOD AND PROGRAM FOR RELAY DEVICE

CROSS-REFERENCE TO RELATED APPLICATION

This application is a National Stage Entry of International Application No. PCT/JP2014/083551, filed Dec. 18, 2014, which is based upon and claims the benefit of priority from Japanese Patent Application No. 2013-262915, filed in Japan on Dec. 19, 2013. The entire contents of the above-referenced applications are expressly incorporated herein by reference.

FIELD

Background

Technology is known in which communication is taken as end-to-end flow, and path control, failure recovery, load balancing, and optimization are performed on a per-flow basis (for example, see Patent Literature 1 and Non-Patent Literature 1 and 2).

Using the technology described in the abovementioned Patent Literature 1 and Non-Patent Literature 1 and 2, by setting appropriate control information in several relay devices having parallel links (for example, control information is set to instruct that particular packets be forwarded to the same destination; in Non-Patent Literature 1 and 2, this is called a flow entry), it is possible to bundle these links and configure trunks of virtual logical links. It is to be noted that in the description below, an Ethernet frame ("Ethernet" is a registered trademark) including header and payload is called a "packet", following 3. Glossary in Non-Patent Literature 2.

However, in a case where a device at one end of the abovementioned trunk is an external communication apparatus not subject to control by a control apparatus, since each relay device forwards a broadcast packet in accordance with a flow entry held by each thereof, the same packet may end up being transmitted multiple times to a particular destination. Even where a flow entry for the broadcast packet is not set, the packet is forwarded between relay devices configuring the same stack by other flow entries, and the broadcast packet may end up being forwarded by an unintended path.

[PTL 1]
WO2008/095010A
[NPL 1]
Nick McKeown and seven other authors, "OpenFlow: Enabling Innovation in Campus Networks", [online], [Search performed on Nov. 29, 2013], Internet <URL: http://archive.openflow.org/documents/openflow-wp-latest.pdf>
[NPL 2]
"OpenFlow Switch Specification" Version 1.1.0. Implemented (Wire Protocol 0x02), [online], [Search performed on Nov. 29, 2013], Internet <URL: http://archive.openflow.org/documents/openflow-spec-v1.1.0.pdf>

SUMMARY

The following analysis is given according to the present invention. With regard to the abovementioned problems, consideration may be given, for example, to connecting stack links between relay devices forming a trunk, in a ring form, determining a representative port from among ports configuring the trunk, and in a case where any of the relay devices forming the trunk receives a packet for flooding represented by the broadcast packet, control is performed to transmit the packet for flooding that has been received via a relay device that has the representative port.

However, in this method, in a case where a plurality of trunks are configured among external communication apparatuses, a number of stack links are necessary corresponding to the number of trunks. At this time, with regard to each relay device configuring a stack link, a problem may occur in that, by using twice as many physical ports (both ends of stack links) as the number of stack links used, the physical ports of the relay devices cannot be effectively used (see FIG. 14).

The present invention provides a packet forwarding system enabling configuration of a plurality of trunks without increasing the number of stack links, a control apparatus, and a control method and program for a relay device.

According to a first aspect, there is provided a control apparatus configuring a plurality of trunks forming virtual logical links, by using physical links between first and second relay devices: a pair of the first relay devices being connected to each other and forming a stack, and the second relay devices group being provided with a plurality of ports and respectively connected to the first relay devices that form the stack. The control apparatus is provided with a trunk group information management unit and a relay device control unit. The trunk group information management unit manages, for a stack link(s) that is a link(s) between the first relay devices forming the stack, trunk group information associating trunks that share the stack link(s) and in which trunk configuration nodes are the same, and determines a representative port from among configuration ports of the first relay devices, for each trunk. The relay device control unit sets first, second and third control information in the first relay devices. The first control information is control information by which, when a packet for flooding is received by the representative port of the trunk, the packet for flooding is forwarded to a prescribed forwarding destination port and to a representative port of another trunk. The second control information is control information by which, when the packet for flooding is received by a nonrepresentative port of the trunk, the packet for flooding is forwarded to a stack link port associated with the same trunk group as the trunk of the port that received the packet for flooding, and is forwarded to a nonrepresentative port of another trunk in the trunk group. The third control information is control information by which, when the packet for flooding is received by a port of the stack link, the packet for flooding is forwarded to a prescribed forwarding destination port and to a representative port of a trunk not belonging to the same trunk group.

According to a second aspect there is provided a packet forwarding system including the abovementioned control apparatus and the first and second relay devices.

According to a third aspect there is provided a control method for a relay device in a packet forwarding system comprising: a pair of first relay devices connected to each other and forming a stack, a second relay device group provided with a plurality of ports and respectively connected to the first relay devices that form the stack, and a control apparatus that uses physical links between the first and second relay devices to form a plurality of trunks forming virtual logical links, wherein the control apparatus comprises: a trunk group information management unit that, for a stack link that is a link between the first relay devices forming the stack, manages trunk group information associating trunks that share the stack link and in which trunk configuration nodes are the same, and determines a representative port from among configuration ports of the first relay devices, for each of the trunks, and the control apparatus sets: first control information by which, when a packet for flooding is received by the representative port of the trunk, the packet for flooding is forwarded to a prescribed forwarding destination port and to a representative port of another trunk; second control information by which, when the packet for flooding is received by a nonrepresentative port of the trunk, the packet for flooding is forwarded to a stack link port associated with the same trunk group as the trunk of the port that received the packet for flooding, and is forwarded to a nonrepresentative port of another trunk in the trunk group; and third control information by which, when the packet for flooding is received by a port of the stack link, the packet for flooding is forwarded to a prescribed forwarding destination port, and to a representative port of a trunk not belonging to the same trunk group. This method is associated with a particular mechanism, which is a control apparatus that controls the first relay devices.

According to a fourth aspect there is provided a computer-readable storage medium storing a program executed by a computer in a packet forwarding system comprising: a pair of first relay devices connected to each other and forming a stack, a second relay device group provided with a plurality of ports and respectively connected to the first relay devices that form the stack, and a control apparatus that uses physical links between the first and second relay devices to form a plurality of trunks forming virtual logical links; the computer having installed thereon a control apparatus comprising: a trunk group information management unit that, for a stack link that is a link between the first relay devices forming the stack, manages trunk group information associating trunks that share the stack link and in which trunk configuration nodes are the same, and determines a representative port from among configuration ports of the first relay devices, for each of the trunks; the program executing a process of setting: first control information by which, when a packet for flooding is received by the representative port of the trunk, the packet for flooding is forwarded to a prescribed forwarding destination port and to a representative port of another trunk; second control information by which, when the packet for flooding is received by a nonrepresentative port of the trunk, the packet for flooding is forwarded to a stack link port associated with the same trunk group as the trunk of the port that received the packet for flooding, and is forwarded to a nonrepresentative port of another trunk in the trunk group; and third control information by which, when the packet for flooding is received by a port of the stack link, the packet for flooding is forwarded to a prescribed forwarding destination port, and to a representative port of a trunk not belonging to the same trunk group. It is to be noted that this program may be recorded on a computer-readable (non-transient) storage medium. That is, the present invention may be embodied as a computer program product.

The meritorious effects of the present invention are summarized as follows. According to the present invention, it is possible to configure a plurality of trunks without increasing the number of stack links. That means that the present invention transforms the conventional control apparatus described as prior art into an innovative control apparatus that having an improved function to configure a plurality of trunks without increasing the number of stack links.

BRIEF DESCRIPTION OF DRAWINGS

FIG. 4 is a diagram showing an example of trunk information held by the control apparatus in the first exemplary embodiment of the invention.

FIG. 5 is an example of stack link information held by the control apparatus in the first exemplary embodiment of the invention.

FIG. 6 is an example of trunk group information held by the control apparatus in the first exemplary embodiment of the invention.

FIG. 7 is an example of representative port information held by the control apparatus in the first exemplary embodiment of the invention.

FIG. 8 is an example of forwarding rules referred to when the control apparatus of the first exemplary embodiment of the invention creates control information (flow entries) for broadcasting.

FIG. 11 is an example of trunk information held by a control apparatus in a second exemplary embodiment of the invention.

FIG. 12 is an example of representative port information and member representative port information held by the control apparatus in the second exemplary embodiment of the invention.

FIG. 13 is an example of forwarding rules referred to when the control apparatus of the second exemplary embodiment of the invention creates control information (flow entries) for broadcasting.

PREFERRED MODES

Figure 1:
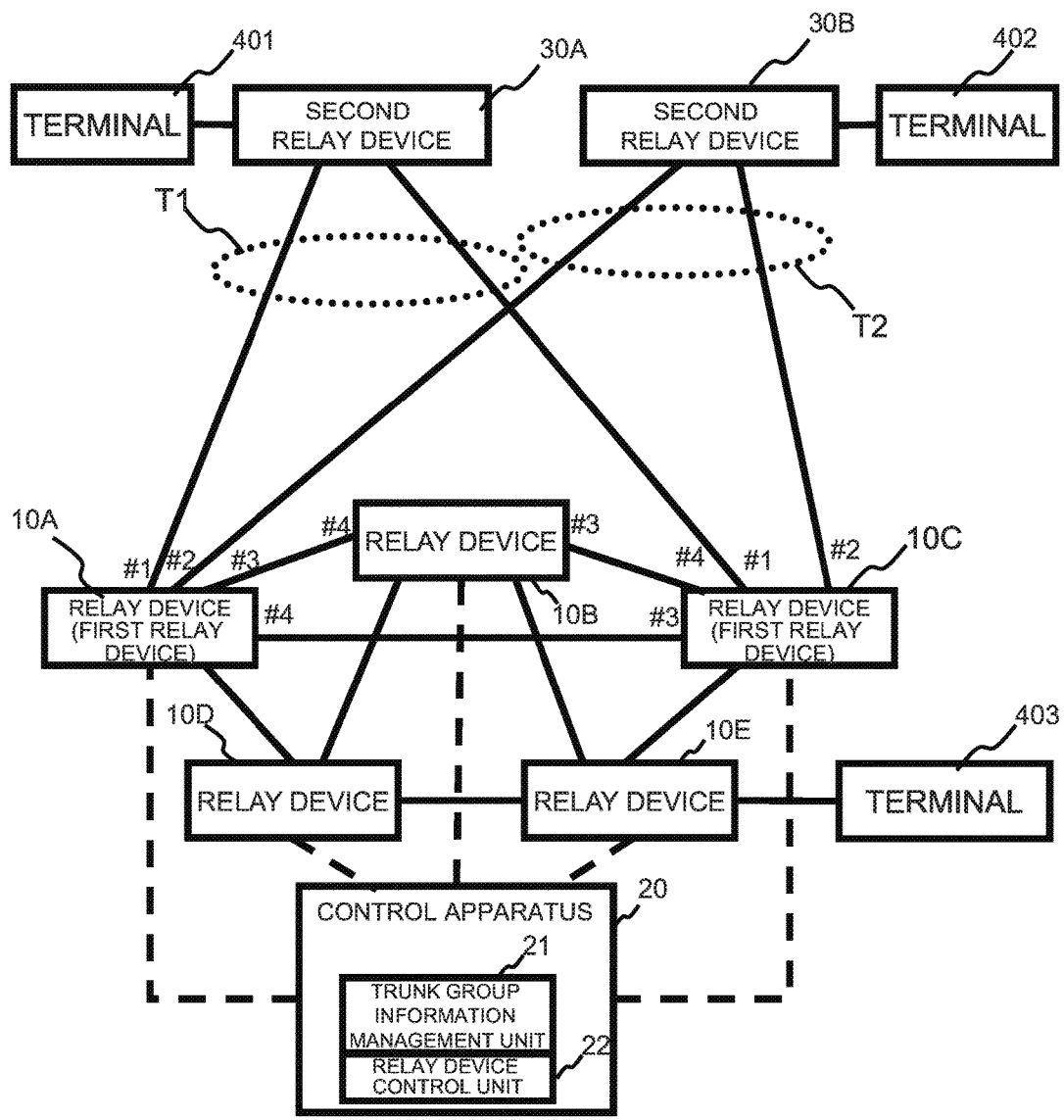
FIG. 1 is a diagram showing a configuration of an exemplary embodiment of the present invention.

First, a description is given of an outline of exemplary embodiments of the present invention, making reference to the drawings. It is to be noted that reference symbols in the drawings attached to this outline are added to respective elements for convenience as examples in order to aid understanding, and are not intended to limit the present invention to modes illustrated in the drawings.

The present invention, in an exemplary embodiment thereof, may be realized by a configuration including a pair of first relay devices (10A, 10C in FIG. 1) connected to each other to form a stack; a second relay device group (30A, 30B in FIG. 1) provided with a plurality of ports and each connected to the first relay devices (10A, 10C in FIG. 1) forming the stack; and a control apparatus (20 in FIG. 1) that uses physical links between the first and second relay devices to form a plurality of trunks (T1, T2 in FIG. 1) forming virtual logical links.

More specifically, the control apparatus (20 in FIG. 1) is provided with: a trunk group information management unit (21 in FIG. 1) that, for a stack link which is a link between the first relay devices forming the stack, shares the stack link, and manages trunk group information associating trunks in which trunk configuration nodes are the same, and determines representative ports from among configuration ports of the first relay devices, for each of the trunks; and a relay device control unit (22 in FIG. 1). The relay device control unit (22 in FIG. 1) sets, in the first relay devices: first control information by which, when a packet for flooding is received by the representative port of the trunk, the packet for flooding is forwarded to a prescribed forwarding destination port and to a representative port of another trunk; second control information by which, when the packet for flooding is received by a nonrepresentative port of the trunk, the packet for flooding is forwarded to a stack link port associated with the same trunk group as the trunk of the port that has received the packet for flooding, and is forwarded to a nonrepresentative port of another trunk in the trunk group; and third control information by which, when the packet for flooding is received by the stack link port, the packet for flooding is forwarded to a prescribed forwarding destination port, and to a representative port of a trunk not belonging to the same trunk group. It is to be noted that in another first relay device that does not form the trunk, forwarding of a packet for flooding is performed in accordance with a pre-calculated distribution tree.

As described above, by setting the first to third control information to perform the abovementioned operations in the pair of first relay devices (10A, 10C in FIG. 1), it is possible to configure a plurality of trunks without providing a plurality of stack links. Since 2 (a pair of) trunk configuration nodes shared by the same trunk group are set, it is not necessary to distinguish trunk type (trunk ID) and the like in the first relay devices (10A, 10C in FIG. 1), and it is possible to curb the number of items of control information (flow entries) set in the first relay devices (10A, 10C in FIG. 1).

First Exemplary Embodiment

Figure 2:
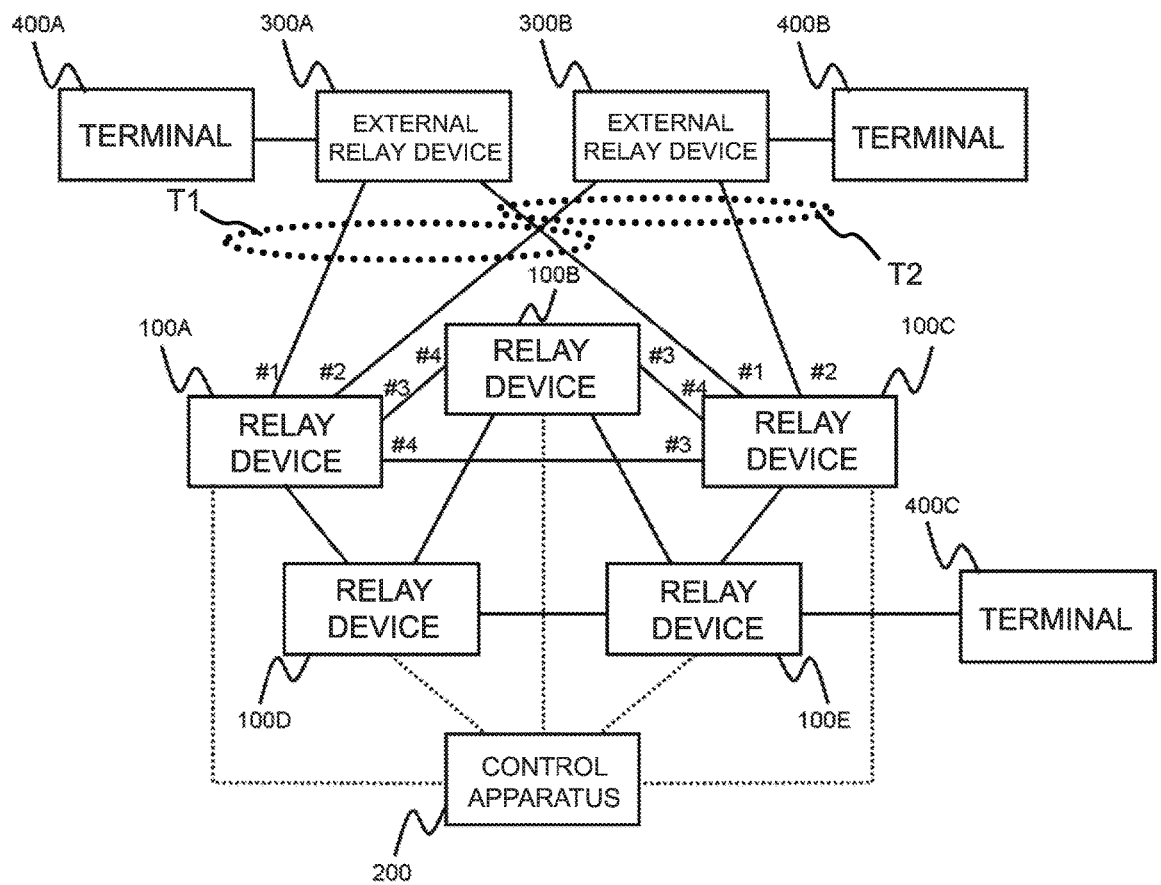
FIG. 2 is a diagram showing a configuration of a communication system in a first exemplary embodiment of the present invention.

FIG. 2 is a diagram representing a configuration of a first exemplary embodiment of the present invention. Referring to FIG. 2, a network is shown that includes a relay device group 100A to 100E connected to each other, a control apparatus 200 that performs centralized control of the relay device group 100A to 100E via control channels illustrated by dotted lines, and external relay devices 300A to 300B (corresponding to second relay devices) outside the management of the control apparatus 200.

The relay device group 100A to 100E relates to devices that refer to control information (flow entries) set by command(s) (setting command for control information (flow entry)) received from the control apparatus 200, to implement processing (forwarding, header rewriting, dropping and the like) of received packets. For this type of relay device, it is possible to use equipment such as an OpenFlow switch of Non-Patent Literature 2. Among the relay device group 100A to 100E, the 2 (1 pair) of relay devices forming trunk configuration nodes correspond to the "first relay devices" described above.

Terminal 400A and terminal 400B are connected to the external relay devices 300A and 300B respectively, and communication is possible with terminal 400C that is connected to the relay device 100E.

Numbers #1 to #4 attached to the relay devices 100A to 100C in FIG. 2 represent port numbers of the respective relay devices. In FIG. 2, data communication paths are shown by solid lines, and control communication paths are shown broken lines, but these 2 may be mixed. It is to be noted that in the following, in a case where the relay devices 100A to 100E, and the external relay devices 300A to 300B are not particularly differentiated, "relay device 100" and "external relay device 300" are respectively described. Where a terminal 400 or an external relay device 300 directly connected to a relay device 100 is generically described, the description "external communication apparatus" is written.

The external relay devices 300A to 300B have a function configuring LAG (Link Aggregation) by a plurality of physical ports. The example of FIG. 2 is formed of a total of 2 sets of trunks T1 and T2, formed by bundling physical links to form virtual logical links, between port #1 of each of the relay devices 100A and 100C and the external relay device 300A, and between port #2 of each of the relay devices 100A and 100C and the external relay device 300B. Furthermore, a stack link connected in a ring shape is formed between each port #3 and port #4 of the relay devices 100A to 100C. This stack link is used in forwarding broadcast packets in respective trunks.

Here, the relay device 100 or the external relay device 300 of FIG. 2 may be treated logically as 1 device with a stackable LAG or the like. Links between respective devices and terminals in FIG. 2 may be connected by LAG, and in this case the ports of respective devices are LAG ports.

Figure 3:
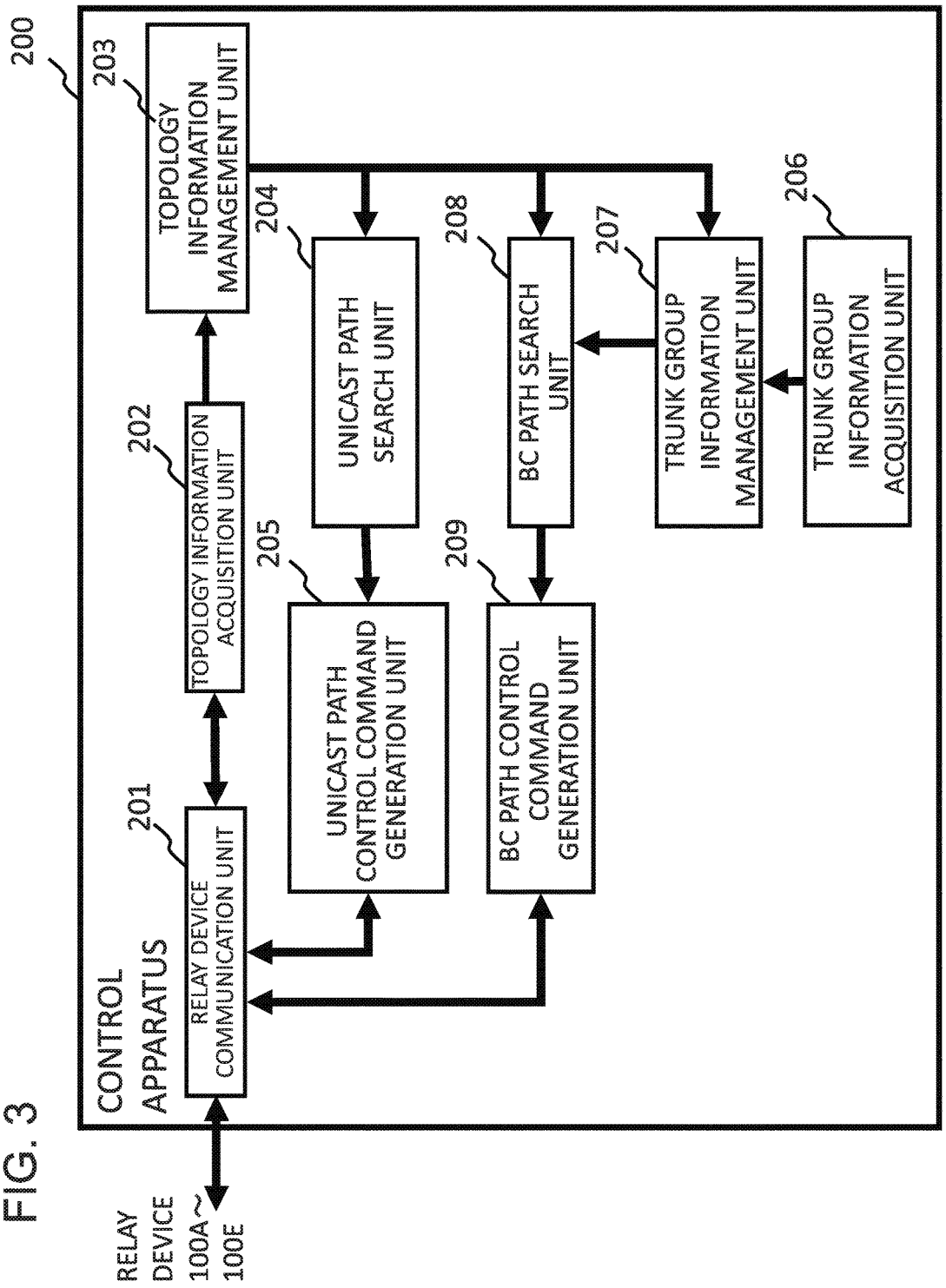
FIG. 3 is a block diagram showing a configuration of a control apparatus in the first exemplary embodiment of the invention.

FIG. 3 is a block diagram representing a detailed configuration of the control apparatus 200 in the abovementioned first exemplary embodiment. FIG. 3 shows a control apparatus 200 provided with: a relay device communication unit 201, a topology information acquisition unit 202, a topology information management unit 203, a unicast path search unit 204, a unicast path control command generation unit 205, a trunk group information acquisition unit 206, a trunk group information management unit 207, a broadcast path search unit (BC path search unit) 208, and a broadcast path control command generation unit (BC path control command generation unit) 209.

The relay device communication unit 201 performs receiving and transmitting of control session establishment and control commands, via control channels among the relay device group 100. Specifically, the relay device communication unit 201 transmits control commands generated in the topology information acquisition unit 202, the unicast path control command generation unit 205 and the BC path control command generation unit 209 respectively, to the relay devices 100A to 100E, and forwards responses from the relay devices 100A to 100E, to the topology information acquisition unit 202, the unicast path control command generation unit 205 and the BC path control command generation unit 209 respectively. It is to be noted that an OpenFlow protocol described in Non-Patent Literature 2 may be used as a control command. Communication with a relay device may be performed using CLI (Command line interface) or SNMP (Simple Network Management Protocol) via Telnet.

The topology information acquisition unit 202 performs communication with the relay devices 100A to 100E via the relay device communication unit 201, collects topology information indicating connection relationships of the relay devices 100A to 100E, and transmits to the topology information management unit 203. In collecting the topology information, it is possible to use, for example, layer 2 (L2)

protocol such as LLDP (Link Layer Discovery Protocol) or the like, to periodically detect interface information among adjacent relay devices.

The topology information management unit 203 stores and manages topology information received from the topology information acquisition unit 202, and provides this to the unicast path search unit 204, the trunk group information management unit 207, and the BC path search unit 208, as appropriate.

The unicast path search unit 204 refers to the topology information of the topology information management unit 203, calculates a path among the relay devices connected between terminals, and generates unicast path information. The unicast path information is notified to the unicast path control command generation unit 205. The unicast path search unit 204 may request a single path between given terminals, or may calculate different paths in communication units. The unicast path search unit 204 may calculate paths making reference to a contract to which a terminal user is subscribed, or to an access policy obtained as a result of user authentication.

The unicast path control command generation unit 205 creates control information to make respective relay devices on a path perform packet forwarding along a path, based on path information notified by the unicast path search unit 204. The unicast path control command generation unit 205 then transmits a control command via the relay device communication unit 201 to the respective relay devices on the path, and sets unicast control information (corresponding to flow entries in Non-Patent Literature 2) in the respective relay devices on the path.

The trunk group information acquisition unit 206 obtains trunk group information from the outside, and provides it to the trunk group information management unit 207. Methods of obtaining the trunk group information from the outside that may be cited include: a method of setting a dedicated UI (User Interface) for recording trunk group information and inputting setting information from a user, or a method of deploying a database inside the control apparatus 200 and reading trunk group information recorded in the database.

The trunk group information management unit 207 stores and manages trunk group information obtained by the trunk group information acquisition unit 206, and provides it to the BC path search unit 208 as appropriate.

The trunk group information management unit 207 manages trunk information (see FIG. 4) combining port information (trunk configuration ports) and the respective relay devices 100 connected to external communication apparatuses that are trunk targets; stack link information (see FIG. 5) combining stack links formed by the respective relay devices 100; and trunk group information (see FIG. 6) combining one of the stack links and at least one of the trunks sharing the stack link. The trunk group information management unit 207 can manage a plurality of items of trunk group information.

Here, the respective relay devices (for example, relay devices 100A and 100C in FIG. 2) forming a trunk are called "trunk configuration nodes", and a relay device (for example, relay device 100B in FIG. 2) configuring a stack link but not a trunk configuration node is called a "stack link node". It is to be noted that the trunk and stack link cannot belong to a plurality of trunk groups. In each trunk, there is one trunk configuration port in a trunk configuration node. For a trunk in a trunk group, another trunk in the same trunk group and an external communication apparatus that is a trunk target may be the same, or may differ. The respective trunks in the same trunk group must be formed by the same trunk configuration nodes, and the number of trunk configuration nodes of the respective trunks must be 2 at most. A stack link may be configured by a trunk configuration node only, or may be configured by a trunk configuration node and 1 or more stack link nodes. A stack link is assumed to have an East stack link port and a West stack link port connected between relay devices 100, and to form a ring-shaped stack link. A trunk group may have a duplicate trunk configuration node or a stack link node with another trunk group, and the trunk configuration node and the trunk configuration node and the stack link node may be duplicated.

In addition, the trunk group information management unit 207 performs representative port selection processing to select one representative port from among the trunk configuration ports of the respective trunks, and saves and manages it as trunk representative port information (see FIG. 7). Here, when selecting the representative port from among the trunk configuration ports, by referring to topology information of the topology information management unit 203, it may be confirmed that the respective trunk configuration ports that are candidates can communicate with an external communication apparatus that is a trunk target, and it may be confirmed that a relay device 100, in which respective trunk configuration ports that are candidates are present, can communicate with another relay device 100 by a port outside of a stack link port. In a case where priorities or the like are included when selecting a representative port of respective trunks in trunk group information obtained by the trunk group information acquisition unit 206, a representative port may be selected by referring to the priorities. It is to be noted that abovementioned representative port selection processing is executed as appropriate when there is a change in trunk group information or topology information of the topology information management unit 203.

Here, a trunk configuration port outside of the representative ports (non-representative port) is called a "member port". A trunk configuration node present in the representative ports is called a "representative node", and a trunk configuration node not present in the representative ports is called a "member node".

FIG. 4 to FIG. 7 are examples of various types of information managed by the trunk group information management unit 207 in the network of FIG. 2. FIG. 4 is an example of trunk information. In the example of FIG. 4, a trunk with trunk ID=T001 configured by port #1 of the relay device 100A and port #1 of the relay device 100C, and a trunk with trunk ID=T002 configured by port #2 of the relay device 100A and port #2 of the relay device 100C are set.

FIG. 5 is an example of stack link information. The example of FIG. 5 shows a stack link set with a stack link ID=S001 with ports #3 and #4 of the relay devices 100A to 100C as an EAST stank link port and a WEST stack link port respectively.

FIG. 6 is an example of trunk group information. The example of FIG. 6 shows that the trunk with trunk ID=T001 and the trunk with trunk ID=T002 are associated with a stack link with stack link ID=S001, and both belong to a trunk group with trunk group ID=G001.

FIG. 7 shows representative port information of a trunk. The example of FIG. 7 indicates that the representative node of the trunk with trunk ID=T001 is the relay device 100A, and its representative port is port #1 thereof. Similarly, FIG. 7 indicates that the representative node of the trunk with trunk ID=T002 is the relay device 100A, and its representative port is port #2 thereof.

The BC path search unit 208 refers to topology information of the topology information management unit 203 and trunk group information (stack link information) of the trunk group information management unit 207, and calculates a distribution tree that enables distribution that does not loop without using a stack link to all relay devices connected at least to an external communication apparatus, for broadcast packet forwarding. Here, the BC search path unit 208 may create one distribution tree by a network, or may create a plurality thereof. In the case of a plurality thereof, distribution trees may be generated that differ for each relay device 100 connected to an external communication apparatus. It is to be noted that where the external communication apparatus is a trunk target, a distribution tree may be calculated where only a relay device 100 with a trunk representative port present is regarded as a relay device 100 connected to the external communication apparatus. In this case, the BC path search unit 208 must refer to topology information of the topology information management unit 203, and the trunk group information (stack link information, trunk configuration port information, truck representative port information) of the trunk group information management unit 207.

The BC path search unit 208 refers to topology information of the topology information management unit 203, the trunk group information of the trunk group information management unit 207, and the distribution tree, applies a broadcast forwarding rule in the same relay device 100 shown in FIG. 8, and creates path information for a broadcast. The path indicated by the path information for the broadcast is a path that enables distribution of broadcast packets without looping, between respective external communication apparatuses.

Here, in a case where a forwarding destination port type is an EAST/WEST stack link port of the same trunk group, FIG. 8 indicates that it is one of either of an EAST stack link port or a WEST stack link port, and may be either one for each trunk, or may be either one for each trunk group. In a case where a receiving port type is an EAST/WEST stack link port of a trunk configuration node, FIG. 8 indicates that basically this is a target for application in a case of reception by either the EAST stack link port or the WEST stack link port. However, for another trunk configuration node in a case where a receiving port type is a member port of a trunk of the same trunk group, where a forwarding destination port type is only an EAST stack link port of the same trunk group, it may be taken as only a WEST stack link port, and for another trunk configuration node in a case where a receiving port type is a member port of a trunk of the same trunk group, where a forwarding destination port type is only an WEST stack link port of the same trunk group, it may be taken as only an EAST stack link port.

It is to be noted that with regard to a trunk where a failure occurs in a trunk configuration port and the number of valid trunk configuration nodes is one, in a forwarding rule of FIG. 8, the BC path search unit 208 performs control by regarding it as being removed from a framework of the same trunk group as the forwarding destination port (removal from the forwarding destination port type to avoid a loop). It is to be noted that in a trunk in this case also, a representative port is present.

The BC path search unit 208 can perform control giving consideration also to a failure with regard to a stack link. For example, in a case of a failure in a certain stack link, a receiving port type with this stack link as a forwarding destination, with regard to a forwarding destination of a member port of the trunk, can respond to a single failure by opposing the direction of an EAST/WEST stack link port of the same trunk group at the forwarding destination.

When a change occurs in topology information of the topology information management unit 203 or trunk group information of the trunk group information management unit 207, the BC path search unit 208 performs calculation of a distribution tree and path information creation for the abovementioned broadcasts. The BC path search unit 208 notifies the BC path control command generation unit 209 of path information for the abovementioned respective broadcasts.

The BC path control command generation unit 209 creates control information (flow entries) for making the respective relay devices 100 on the path, to forward broadcast packets along the path, based on broadcast path information notified by the BC path search unit 208. The BC path control command generation unit 209 then transmits a control command via the relay device communication unit 201 to the respective relay devices 100 on the paths, and sets broadcast control information (flow entries) in the respective relay devices 100 on the paths. This type of control information (flow entries), as in the flow entries of Non-Patent Literature 2, can be realized in a configuration associating a matching condition specifying a packet to be controlled and a receiving port, and processing content (action) to be applied to a packet conforming with this match condition.

Figure 9:
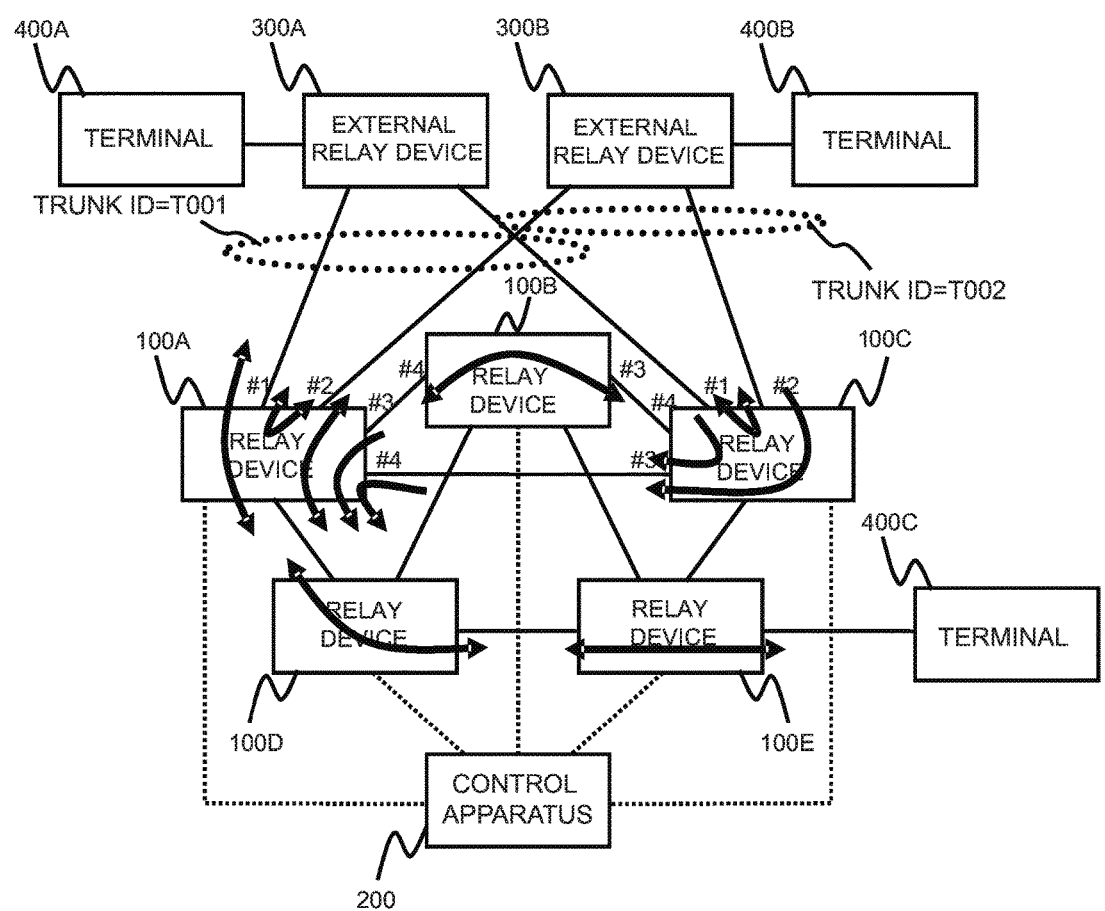
FIG. 9 is a flowchart representing, by arrows, forwarding operations of BC packets according to control information (flow entries) set by the control apparatus in the first exemplary embodiment of the invention.

FIG. 9 is a flowchart representing, by arrows, forwarding operations of BC packets according to control information (flow entries) set by the abovementioned control apparatus 200 in the network of FIG. 2. For example, a broadcast packet of trunk T1 with trunk ID=001 received by port #1 (representative port) of the relay device 100A is forwarded to a distribution tree port for a broadcast packet (for example, a relay device 100D connection port of the relay device 100A of FIG. 10), an external communication node port that is not a trunk configuration port (not applicable in FIG. 10), and a representative port of another trunk (port #2 etc. of the relay device 100A of FIG. 10), in accordance with forwarding rules of FIG. 8 (operation according to first control information (flow entries)).

Similarly, for example, a broadcast packet of trunk T1 with trunk ID=001 received by port #1 (member port) of the relay device 100C is forwarded to an EAST/WEST stack link port (for example, port #3 of the relay device 100C in FIG. 10) of the same trunk group, and is forwarded to a member port (port #2 of the relay device 100C in FIG. 10) of another trunk (that is, trunk T2 with trunk ID=002) of the same trunk group, in accordance with forwarding rules of FIG. 8 (operation according to second control information (flow entries)).

Figure 10:
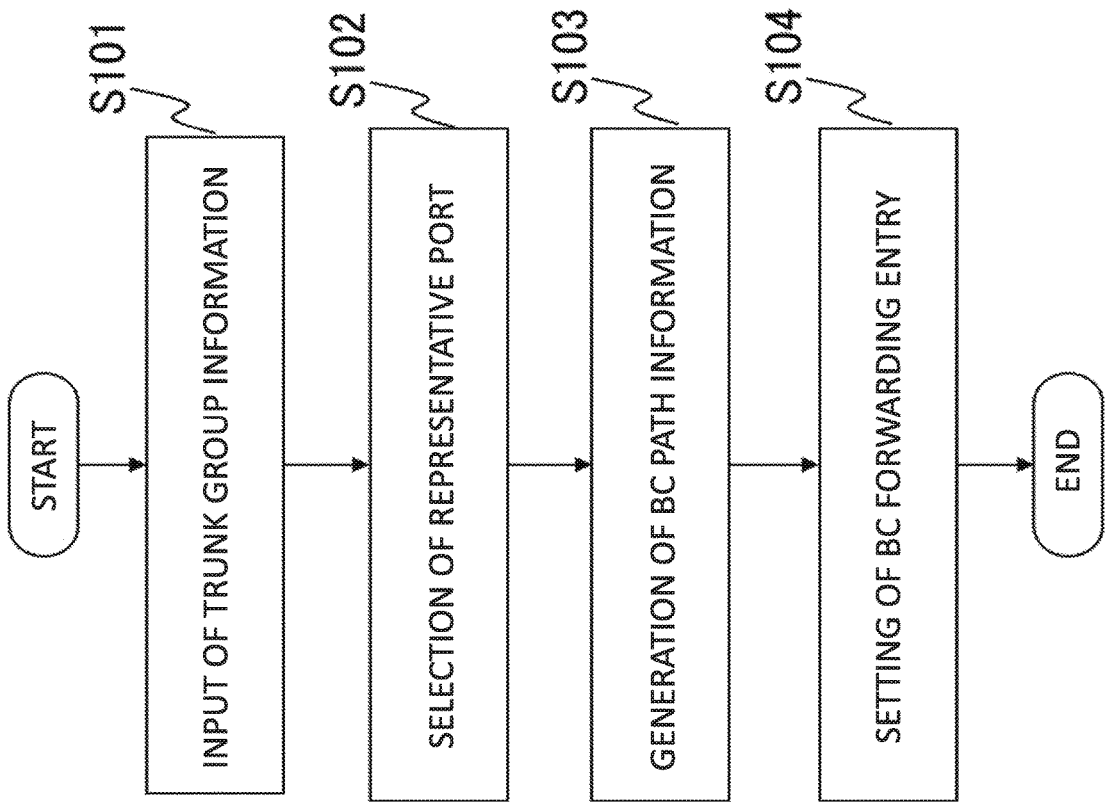
FIG. 10 is a flowchart representing operations as far as setting of control information (flow entries) in relay devices in the first exemplary embodiment of the invention.
Figure 14:
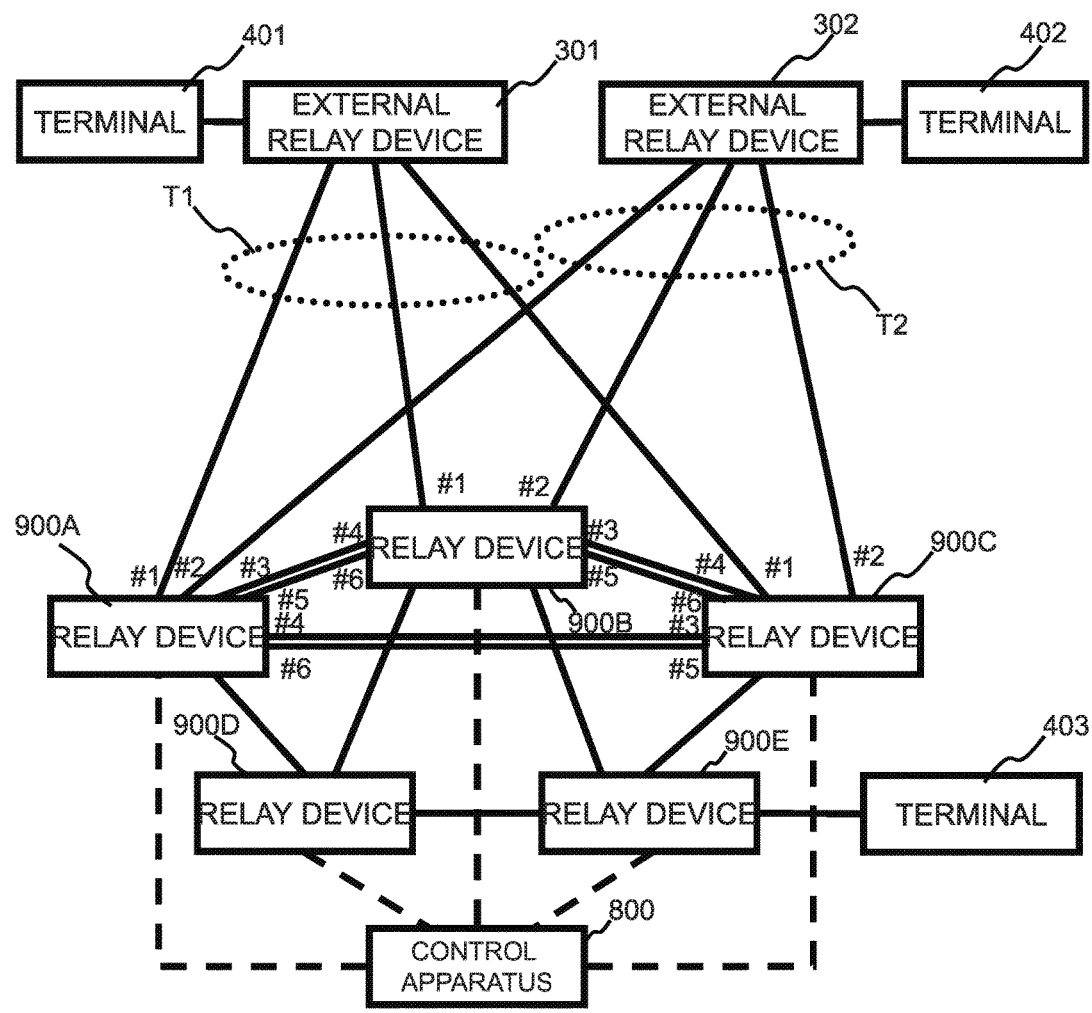
FIG. 14 is an example in which a plurality of stack links are provided among relay devices to configure trunks (comparative example 1).

With regard to the relay device 100A that thus receives the broadcast packet via the EAST/WEST stack link, forwarding occurs to a distribution tree port for the broadcast packet (for example, a relay device 100D connection port of the relay device 100A of FIG. 10), an external communication node port that is not a trunk configuration port (not applicable in FIG. 10), and a representative port of a trunk outside of the same trunk group (not applicable in FIG. 10), in accordance with forwarding rules of FIG. 8 (third control information (flow entries)).

It is to be noted that the respective parts (processing means) of the control apparatus 200 shown in FIG. 3 can be implemented by a computer program that executes the abovementioned respective processing on a computer configuring the control apparatus 200, using hardware thereof.

Next, a detailed description is given concerning operations of the present exemplary embodiment, making reference to the drawings. FIG. 10 is a flowchart showing flow for setting broadcast control information (flow entries) in relay devices 100 by the control apparatus 200 of the first exemplary embodiment of the present invention.

Referring to FIG. 10, the trunk group information acquisition unit 206 first obtains trunk group information and provides it to the trunk group information management unit 207 (step S101).

Next, the trunk group information management unit 207 selects one representative port of each trunk from trunk group information obtained from the trunk group information acquisition unit 206 and topology information obtained from the topology information management unit 203. The trunk group information management unit 207 then provides trunk group information including the selected trunk representative port information, to the BC path search unit 208 (step S102).

Next, the BC path search unit 208 refers to topology information of the topology information management unit 203 and trunk group information of the trunk group information management unit 207, and calculates a broadcast distribution tree. The BC path search unit 208 generates topology information of the topology information management unit 203, trunk group information of the trunk group information management unit 207, the calculated distribution tree, and broadcast path information in accordance with a broadcast forwarding rule as shown in FIG. 8. In addition, the BC path search unit 208 provides path information of the respective generated broadcasts to the BC path control command generation unit 209 (step S103).

Finally, the BC path control command generation unit 209 generates control information (flow entries) for implementing forwarding of broadcast packets in accordance with path information for the respective broadcasts received by the BC path search unit 208 (step S104).

As described above, according to the present exemplary embodiment, it is possible to implement broadcasting between external communication apparatuses while sharing stack links with a plurality of trunks.

According to the present exemplary embodiment, it is possible to curb the number of items of control information (flow entries) set in the first relay devices 100A and 100C. The reason for this is that, referring to the forwarding rule shown in FIG. 8, the abovementioned first to third control information items are generated and set in trunk configuration nodes. Thus, when a broadcast packet is received by a trunk member port, a trunk configuration node forwards the broadcast packet to a stack link port of the same trunk group as the member port trunk, and at the same time also forwards to a member port of another trunk of the same trunk group (second control information). When the broadcast packet is received by a stack link port of the trunk configuration node, the trunk configuration node forwards the broadcast packet to a broadcast forwarding destination port outside of trunks of the same trunk group sharing the stack link (third control information). As a result thereof, it is possible to receive and transmit broadcast packets with respect to external communication apparatuses without assigning identification information for identifying a trunk to a broadcast packet even if stack links are shared by a plurality of trunks.

In the present exemplary embodiment, since there is no need to assign a trunk ID to a packet, and for example, packet encapsulation and decapsulation need not be performed, reduction in processing amount in relay nodes and improvement in throughput can be expected. There is also an effect in that the amount not encapsulated, MTU (Maximum Transmission Unit) need not be reduced.

Second Exemplary Embodiment

In the first exemplary embodiment described above, a description was given in which, for each trunk there is 1 trunk configuration port in a trunk configuration node, but for each trunk there may be a plurality of trunk configuration ports in a trunk configuration node (see FIG. 11). Below, a description is given concerning a second exemplary embodiment of a case where, for each trunk there are plural trunk configuration ports in a trunk configuration node. Since the basic configuration and operations are in common with the first exemplary embodiment, the description below is centered on differences from the first exemplary embodiment.

A trunk group information management unit 207 performs representative port selection processing to select one representative port from among trunk configuration ports of the respective trunks similarly to the first exemplary embodiment, and saves and manages it as representative port selection information for a trunk. Member representative port selection processing is performed to select 1 member representative port from among the trunk configuration ports of the member nodes of the respective trunks after representative port selection, and to save and manage this as member representative port selection information for a trunk.

Here, when selecting the member representative port, it may be confirmed that the respective trunk configuration ports of member nodes that are candidates can communicate with an external communication apparatus that is a trunk target, by referring to topology information of a topology information management unit 203. In a case where priorities or the like are included when selecting a member representative port of respective trunks in trunk group information obtained by a trunk group information acquisition unit 206, the trunk group information management unit 207 may select a member representative port by referring to the priority information thereof. It is to be noted that the selection processing of a member representative port as described above is executed as appropriate when there is a change in trunk group information or topology information of the topology information management unit 203.

Therefore, the trunk configuration port in the second exemplary embodiment is any 1 of representative port and member port of representative node, member representative port, and member port of member node (see FIG. 12).

FIG. 13 is an example of forwarding rules for broadcasting to be referred to, when creating path information for a broadcast, in the second exemplary embodiment. A difference from a forwarding rule for a broadcast in the first exemplary embodiment shown in FIG. 8 is the part where a receiving port type is "a representative port of a trunk/a member port of a representative node of a trunk"–"an EAST/WEST stack link port of the trunk group". Here, FIG. 13 indicates a case where, when the receiving port type is a representative port of a trunk/a member port of a representative node of a trunk, it is a representative port of a trunk or a member port of a representative node of a trunk, and a case where, when the receiving port type is a member representative port of a trunk/member port of a member node of a trunk, it is a member representative port of a trunk or a member port of a member node of a trunk. It is to be noted that a case where the forwarding destination port type is an EAST/WEST stack link port of the same trunk group, and the receiving port type is an EAST/WEST stack link port of a trunk configuration node, are the same as forwarding rules of FIG. 8 described in the first exemplary embodiment.

In the present exemplary embodiment, with regard to a trunk where a failure occurs in a trunk configuration port and the number of valid trunk configuration nodes is one, the BC path search unit 208 performs control by regarding it as being removed from a framework of the same trunk group as the forwarding destination port type, in forwarding rule(s) of FIG. 13. It is to be noted that in a trunk in this case also, a representative port or a member port of a representative node is present.

As described above, according to the present exemplary embodiment, by setting control information (flow entries) for a trunk configuration node, without performing setting to have plural trunk configuration ports as LAG ports, it is possible to realize band width improvement and availability improvement of links between trunk configuration ports and external communication apparatuses.

A reason for this is that the configuration is such that in respective trunks, when there are plural trunk configuration ports in a trunk configuration node, a representative port and member representative port are selected from among trunk configuration ports for each trunk, broadcast path information is generated based on forwarding rule(s) exemplified in FIG. 13, and corresponding control information (flow entries) is generated and set in the relay device 100.

A description has been given above of respective exemplary embodiments of the present invention, but the present invention is not limited to the abovementioned exemplary embodiments, and further modifications, substitutions and adjustments may be added within a scope that does not depart from fundamental technical concepts of the invention. Network configurations, respective element configurations and message expression forms shown in the respective drawings are examples for the purpose of aiding understanding of the invention, and are not intended to limit the invention to configurations illustrated in the drawings.

In the abovementioned exemplary embodiments for example, a description was given citing an example of performing forwarding control of a broadcast packet, but it is also possible to have a packet outside of a broadcast packet as the packet to be controlled. For example, application is possible to general forwarding of packets to perform flooding, such as multicast packets or "Unknown" unicast packets etc. to be forwarded from an external communication apparatus (Third Exemplary Embodiment).

In the abovementioned exemplary embodiments, a description was given with stack links connected in a ring shape, but it is also possible to use other network configurations in which forwarding from a member node to a representative node is possible (Third Exemplary Embodiment).

Finally, preferred modes of the present invention are summarized.
<First Mode>
(Refer to the control apparatus according to the first aspect described above.)
<Second Mode>
The control apparatus of the first mode, wherein the packet for flooding is either a broadcast packet, a multicast packet, or an Unknown unicast packet.
<Third Mode>
The control apparatus of the first or second mode, wherein, in a case of a plurality of ports that configure a trunk being present in the trunk configuration node, the relay device control unit sets: first control information by which, when the packet for flooding is received by the representative port of the trunk or by the same trunk configuration port of a first relay device in which the representative port is present, the packet for flooding is forwarded to a prescribed forwarding destination port and to a representative port of another trunk; second control information by which, when a packet for flooding is received by a port belonging to a trunk of the same trunk group of the first relay device that does not have the representative port of the trunk, forwarding is performed to a stack link port associated with the same trunk group as the trunk of the port that received the packet for flooding, and forwarding is performed to a member representative port of another trunk in the trunk group; and third control information by which, when the packet for flooding is received by a port of the stack link, the packet for flooding is forwarded to a prescribed forwarding destination port and to a representative port of a trunk not belonging to the same trunk group.
<Fourth Mode>
The control apparatus of any one of the first to third modes, wherein the control information is configured by associating at least a match condition specifying a packet to be controlled and a receiving port, and processing content to be applied to a packet conforming with the match condition.
<Fifth Mode>
(Refer to the packet forwarding system according to the second aspect described above.)
<Sixth Mode>
(Refer to the control method for a relay device according to the third aspect described above.)
<Seventh Mode>
(Refer to the program according to the fourth aspect described above.) It is to be noted that the fifth to seventh modes described above may be expanded with regard to the second to fourth modes, similar to the first mode.

It is to be noted that the various disclosures of the abovementioned Patent Literature and Non-Patent Literature are incorporated herein by reference thereto. Modifications and adjustments of exemplary embodiments and examples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments and examples, respective elements of the respective drawings, and the like) are possible within the scope of the claims of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST 10A-10E, 100A-100E, 900A-900E relay device
30A-30B second relay device
20, 200, 800 control apparatus
21 trunk group information management unit
22 relay device control unit
201 relay device communication unit
202 topology information acquisition unit 203 topology information management unit
204 unicast path search unit
205 unicast path control command generation unit
206 trunk group information acquisition unit
207 trunk group information management unit
208 broadcast path search unit (BC path search unit)
209 broadcast path control command generation unit (BC path control command generation unit)
300A-300B, 301, 302 external relay device
401-403 terminal

The invention claimed is:

1. A control apparatus,
said control apparatus comprising:
a trunk group information management unit, implemented by one or more processors, that, for stack link(s), manages trunk group information associating trunks that share said stack link(s) and in which a pair of first relay devices forming a trunk are the same, and determines a representative port from among ports of said pair of first relay devices configuring a trunk for each of said trunks;
wherein the control apparatus is adapted to configure a plurality of trunks forming virtual logical links by using:
the pair of first relay devices being connected to each other via a physical link, the physical link being a stack link,
the second relay devices each being provided with a plurality of ports and respectively connected to at least one of said pair of first relay devices, and
physical links between the first relay devices and the second relay devices; and
a relay device control unit, implemented by the one or more processors, that sets in said first relay devices:
first control information by which, when a packet for flooding is received by said representative port of said trunk, the packet for flooding is forwarded to at least one prescribed forwarding destination port and to a representative port of other trunk(s);
second control information by which, when a packet for flooding is received by a nonrepresentative port of said trunk, the packet for flooding is forwarded to a stack link port associated with the same trunk group as said trunk of said port that received the packet for flooding, and is forwarded to a nonrepresentative port of other trunk(s) in said trunk group; and
third control information by which, when a packet for flooding is received by a port of said stack link, the packet for flooding is forwarded to at least one prescribed forwarding destination port and to a representative port of other trunk(s) not belonging to the same trunk group.

2. The control apparatus according to claim 1, wherein the packet for flooding is any of a broadcast packet, a multicast packet, or an Unknown unicast packet.

3. The control apparatus according to claim 1, wherein, in a case of a plurality of ports that configure a trunk being present in said pair of first relay devices forming a trunk, said relay device control unit sets:
first control information by which, when a packet for flooding is received by said representative port of said trunk or by the same trunk-configuring port of a first relay device in which said representative port is present, the packet for flooding is forwarded to at least one prescribed forwarding destination port and to a representative port of other trunk(s);
second control information by which, when a packet for flooding is received by a port belonging to the same trunk of the same trunk group of a first relay device that does not have said representative port of said trunk, forwarding is performed to a stack link port associated with the same trunk group as said trunk of said port that received the packet for flooding, and forwarding is performed to a member representative port of other trunk(s) in said trunk group; and
third control information by which, when a packet for flooding is received by a port of said stack link, the packet for flooding is forwarded to at least one prescribed forwarding destination port and to a representative port of other trunk(s) not belonging to the same trunk group.

4. The control apparatus according to claim 1, wherein said control information is configured by associating at least a match condition specifying a packet to be controlled and a receiving port, and processing content to be applied to a packet conforming with said match condition.

5. The control apparatus according to claim 2, wherein, in a case of a plurality of ports that configure a trunk being present in said pair of first relay devices forming a trunk, said relay device control unit sets:
first control information by which, when a packet for flooding is received by said representative port of said trunk or by the same trunk-configuring port of a first relay device in which said representative port is present, the packet for flooding is forwarded to at least one prescribed forwarding destination port and to a representative port of other trunk(s);
second control information by which, when a packet for flooding is received by a port belonging to the same trunk of the same trunk group of a first relay device that does not have said representative port of said trunk, forwarding is performed to a stack link port associated with the same trunk group as said trunk of said port that received the packet for flooding, and forwarding is performed to a member representative port of other trunk(s) in said trunk group; and
third control information by which, when a packet for flooding is received by a port of said stack link, the packet for flooding is forwarded to at least one prescribed forwarding destination port and to a representative port of other trunk(s) not belonging to the same trunk group.

6. The control apparatus according to claim 2, wherein said control information is configured by associating at least a match condition specifying a packet to be controlled and a receiving port, and processing content to be applied to a packet conforming with said match condition.

7. The control apparatus according to claim 3, wherein said control information is configured by associating at least a match condition specifying a packet to be controlled and a receiving port, and processing content to be applied to a packet conforming with said match condition.

8. A packet forwarding system comprising:
a pair of first relay devices being connected to each other via a physical link, the physical link being a stack link;
second relay devices each being provided with a plurality of ports and respectively connected to at least one of said pair of first relay devices;
physical links between the first relay devices and the second relay devices; and
a control apparatus that uses said physical links and is adapted to form a plurality of trunks forming virtual logical links;

said control apparatus comprising:
a trunk group information management unit, implemented by one or more processors, that, for the stack link(s), manages trunk group information associating trunks that share said stack link(s) and in which said pair of first relay devices forming trunk are the same, and determines a representative port from among ports of said pair of first relay devices configuring a trunk for each of said trunks; and
a relay device control unit, implemented by the one or more processors, that sets in said first relay devices:
first control information by which, when a packet for flooding is received by said representative port of said trunk, the packet for flooding is forwarded to at least one prescribed forwarding destination port and to a representative port of other trunk(s);
second control information by which, when a packet for flooding is received by a nonrepresentative port of said trunk, the packet for flooding is forwarded to a stack link port associated with the same trunk group as said trunk of said port that received the packet for flooding, and is forwarded to a nonrepresentative port of other trunk(s) in said trunk group; and
third control information by which, when a packet for flooding is received by a port of said stack link, the packet for flooding is forwarded to at least one prescribed forwarding destination port and to a representative port of other trunk(s) not belonging to the same trunk group.

9. The packet forwarding system according to claim 8, wherein, in a case of a plurality of ports that configure a trunk being present in said pair of first relay devices forming a trunk, said relay device control unit sets:
first control information by which, when a packet for flooding is received by said representative port of said trunk or by the same trunk configuration port of a first relay device in which said representative port is present, the packet for flooding is forwarded to at least one prescribed forwarding destination port and to a representative port of other trunk(s);
second control information by which, when a packet for flooding is received by a port belonging to the same trunk of the same trunk group of said first relay device that does not have said representative port of said trunk, forwarding is performed to a stack link port associated with the same trunk group as said trunk of said port that received the packet for flooding, and forwarding is performed to a member representative port of other trunk(s) in said trunk group; and
third control information by which, when a packet for flooding is received by a port of said stack link, the packet for flooding is forwarded to at least one prescribed forwarding destination port and to a representative port of other trunk(s) not belonging to the same trunk group.

10. A control method for a relay device in a packet forwarding system
the control method comprising:
setting, by a control apparatus, first control information by which, when a packet for flooding is received by a representative port of a trunk, the packet for flooding is forwarded to at least one prescribed forwarding destination port and to a representative port of other trunk(s);
wherein the forwarding system comprises:
a pair of first relay devices being connected to each other via a logical link, the logical link being a stack link; and
second relay devices each being provided with a plurality of ports and respectively connected to at least one of said pair of first relay devices;
forming, by said control apparatus using physical links, plurality of trunks forming virtual logical links;
wherein said physical links are between the first relay devices and the second relay devices;
managing, by a trunk group information management unit implemented by one or more processors, that, for the stack link(s), trunk group information associating trunks that share said stack link(s) and in which said pair of first relay devices forming a trunk are the same;
determining a representative port from among ports of said pair of first relay devices configuring a trunk for each of said trunks;
setting, by said control apparatus, a second control information by which, when a packet for flooding is received by a nonrepresentative port of said trunk, the packet for flooding is forwarded to a stack link port associated with the same trunk group as said trunk of said port that received the packet for flooding, and is forwarded to a nonrepresentative port of other trunk(s) in said trunk group; and
setting, by said control apparatus, a third control information by which, when a packet for flooding is received by a port of said stack link, the packet for flooding is forwarded to at least one prescribed forwarding destination port, and to a representative port of other trunk(s) not belonging to the same trunk group.

11. A non-transitory computer-readable recording medium storing thereon a program executed by a computer in a packet forwarding system,
said program causing the computer to perform a method comprising:
setting first control information by which, when a packet for flooding is received by a representative port of a trunk, the packet for flooding is forwarded to at least one prescribed forwarding destination port and to a representative port of other trunk(s);
wherein the forwarding system comprises:
a pair of first relay devices being connected to each other via a logical link, the logical link being a stack link; and
second relay devices each being provided with a plurality of ports and respectively connected to at least one of said pair of first relay devices;
forming, using physical links, plurality of trunks forming virtual logical links;
wherein said physical links are between the first relay devices and the second relay devices;
managing, for the stack link(s), trunk group information associating trunks that share said stack link(s) and in which said pair of first relay devices forming a trunk are the same;
determining a representative port from among ports of said pair of first relay devices configuring a trunk for each of said trunks;
setting second control information by which, when a packet for flooding is received by a nonrepresentative port of said trunk, the packet for flooding is forwarded to a stack link port associated with the sam e trunk group as said trunk of said port that received the packet for flooding, and is forwarded to a nonrepresentative port of other trunk(s) in said trunk group; and setting third control information by which, when a packet for flooding is received by a port of said stack link, the packet for flooding is forwarded to at least one prescribed forwarding destination port, and to a representative port of other trunk(s) not belonging to the same trunk group.

\* \* \* \* \*